April 5, 1938.　　　B. F. STOWELL　　　2,113,414

GAUGE MECHANISM

Filed Sept. 25, 1936

INVENTOR
*Byron F. Stowell*
BY
*Chapin & Neal*
ATTORNEYS

UNITED STATES PATENT OFFICE 2,113,414

GAUGE MECHANISM

Byron F. Stowell, Springfield, Mass., assignor to Van Norman Machine Tool Company, Springfield, Mass., a corporation of Massachusetts Application September 25, 1936, Serial No. 102,447

3 Claims. (Cl. 33—172)

In the grinding of generally cylindrical work pieces, such as ball bearing races, it is common practice to gauge the size of the work as grinding progresses by means of a diamond point in constant engagement with the surface being ground and in mechanical connection with a suitable gauge mechanism. This gauge may be of the visual type or may operate through electrical contacts to control the operation of the grinding mechanism. Frequently the work piece is initially rough or eccentric, and during the preliminary stages of grinding a heavy vibration is communicated to the gauge through the diamond point which results in rapid wear on the delicate gauge mechanism. It is the object of the present invention to provide a simple means whereby the transmission of this heavy initial vibration to the gauge mechanism is avoided.

Figure 1:
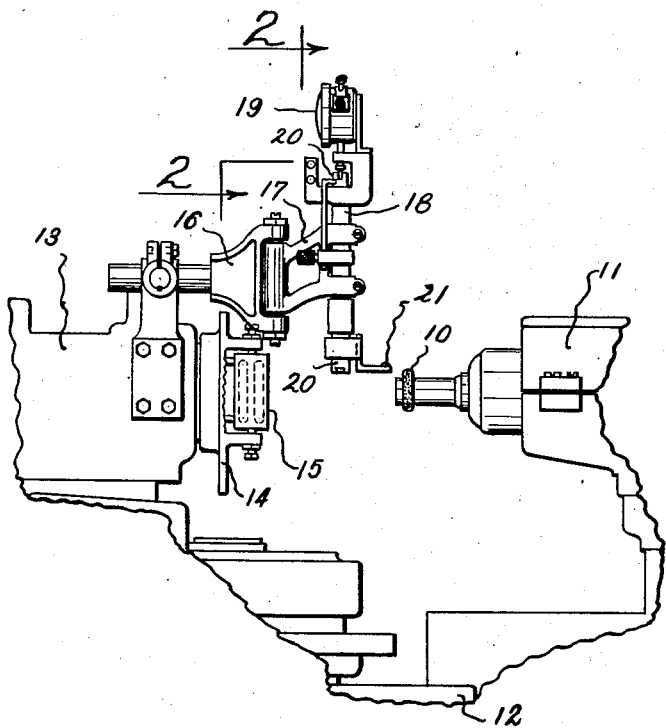
Figure 2:
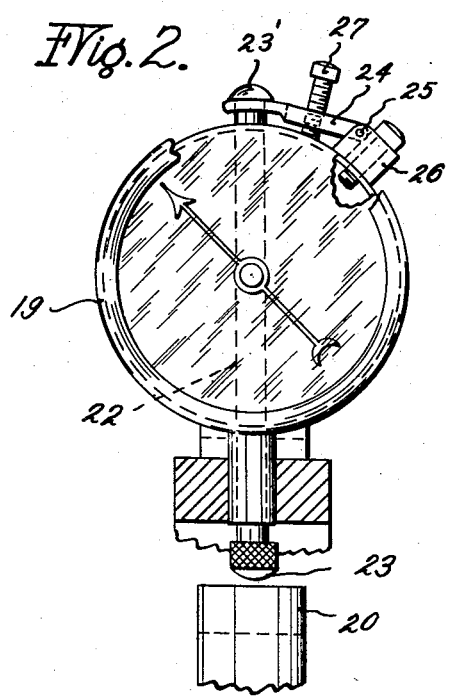
Figure 3:
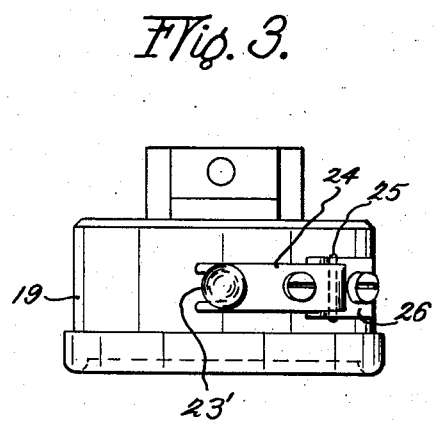

The invention will now be described in connection with the accompanying drawing, in which Fig. 1 is a side elevation of a portion of a grinding machine to which the invention may be applied;

Fig. 2 is a section on line 2—2 of Fig. 1 showing the improved mechanism applied to a gauge which may be of the visual or the electrical type; and Fig. 3 is a top view of the mechanism shown in Fig. 2.

The grinding machine chosen for purposes of illustration has a grinding wheel 10 rotatably carried on a head 11 adapted for longitudinal and lateral movement on the base 12. An oscillating head 13 carries a rotating spindle bearing a chuck 14 in which the work piece 15 is mounted. Also carried by the oscillating head is a bracket 16 bearing a swinging support 17 for a sleeve 18 which bears the gauge 19. In the sleeve 18 is mounted a rod 20 carrying the diamond point 21 and pressed upwardly by a spring (not shown). This construction, as well as one detailed form of electrical gauge, is fully set forth in the Stowell Patent 1,926,603 dated September 12, 1933, and need not be described here in detail. The diamond point and the gauge are here shown as having been rotated on the bracket 16 into inactive position. When the gauge is in operation the diamond point extends into the interior of the work piece 15 and bears on its inner periphery at all times during the progress of the grinding operation.

The gauge 19 is here shown for simplicity as being of the visual type, but it will be understood that the electrical type shown in the Stowell patent may be used with equal facility. The gauge has an operating rod 22 extending through it and having a tappet 23 at its lower end adapted to be contacted by the upper end of the rod 20. In the construction shown in the Stowell patent the gauge operating rod was in contact at all times with the rod 20, and partook of the vibration of the latter rod when the initial part of the grinding operation was taking place. This resulted in rapid wear and inaccuracy in operation of the delicate gauge mechanism, even though a dash pot was used to reduce the amplitude of the vibrations. In accordance with the present invention mechanism is provided for holding the gauge operating rod out of contact with the rod 20 during as much of the initial grinding operation as may be desirable. Irrespective of the irregularity or eccentricity of the work piece at the start of the grinding operation, the rod 20 does not make contact with the gauge operating rod until the work piece has been ground to a predetermined size. This size is so chosen that all irregularities will have been ground out before the gauge comes into action and the deleterious effects of vibration on the gauge mechanism are thus done away with.

While various mechanisms may be used to accomplish this result the one chosen for operation is of great simplicity. The upper end of the gauge operating rod 22 is provided with a head 23', and under this head is located the forked end of a lever 24 pivoted at 25 to a bracket 26 secured to the gauge casing. A screw 27 threaded through the lever strikes against the gauge casing to limit the downward movement of the gauge operating rod. By adjusting the screw 27 the size of the work piece at which the gauge comes into operation can be determined as desired. The use of the lever between the stop screw and the head 23 is of advantage in increasing the accuracy with which the position at which the operating rod 22 stops can be regulated.

I claim:

1. A gauging mechanism for rotating work pieces comprising a gauge, means for supporting the gauge in a predetermined position relative to the work piece, an operating member for the gauge, a movable device having a surface adapted to contact the rotating surface of the work piece at the point to be gauged and a second surface adapted to contact the operating member of the gauge to actuate it, means for supporting the movable device with its work-contacting surface in contact with the rotating work piece and with its second surface in adjacency to the operating member of the gauge, and means for holding the operating member of the gauge in position to contact with the second surface of the movable device when the work piece has reached a predetermined size.

2. A gauging mechanism for rotating work pieces comprising a gauge, means for supporting the gauge in a predetermined position relative to the work piece, an operating member for the gauge, a movable device having a surface adapted to contact the rotating surface of the work piece at the point to be gauged and a second surface adapted to contact the operating member of the gauge to actuate it, means for supporting the movable device with its work-contacting surface in contact with the rotating work piece and its second surface in adjacency to the operating member of the gauge, and an adjustable stop limiting the approach of the gauge operating member towards the second surface of the movable device.

3. A gauging mechanism for grinding machines comprising a movable device having a feeler point adapted to contact the rotating surface of the work piece during the grinding operation, means for supporting the movable device with its feeler in contact with the rotating work piece, a gauge, means for supporting the gauge in a predetermined position relative to the work piece, an operating member for the gauge, said movable device having an abutment positioned to contact the gauge operating member to actuate the same as the grinding proceeds, a pivoted lever mounted to engage the gauge operating member, and means including an adjustable stop screw for limiting the movement of the operating member towards the abutment of the movable device so that the operating member of the gauge can be mechanically separated from the abutment of the movable device during the fluctuations in position of the latter during the initial part of the grinding operation.

BYRON F. STOWELL.